US009430587B2

(12) United States Patent
van der Meulen et al.

(10) Patent No.: US 9,430,587 B2
(45) Date of Patent: Aug. 30, 2016

(54) TECHNIQUES FOR MANAGING MEDIA CONTENT

(75) Inventors: Pieter S. van der Meulen, Los Altos, CA (US); Matt W. Crowley, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1042 days.

(21) Appl. No.: 11/447,533

(22) Filed: Jun. 5, 2006

(65) Prior Publication Data

US 2007/0282908 A1 Dec. 6, 2007

(51) Int. Cl.
*G06F 7/00* (2006.01)
*G06F 17/30* (2006.01)
*G06Q 10/06* (2012.01)

(52) U.S. Cl.
CPC .......... *G06F 17/30997* (2013.01); *G06Q 10/06* (2013.01)

(58) Field of Classification Search
CPC .................... G06F 17/30017; G06F 17/30056; G06F 17/30058; G06F 2212/464; G06F 17/30997; G06Q 10/06
USPC .......... 707/104, 953, 802, 999.107, 793, 912, 707/792
See application file for complete search history.

(56) References Cited

U.S. PATENT DOCUMENTS

| | | | |
|---|---|---|---|
| 2003/0182052 A1* | 9/2003 | DeLorme et al. | 701/201 |
| 2003/0191776 A1* | 10/2003 | Obrador | 707/104.1 |
| 2004/0128308 A1* | 7/2004 | Obrador | 707/102 |
| 2004/0205028 A1* | 10/2004 | Verosub et al. | 705/59 |
| 2005/0027712 A1* | 2/2005 | Gargi et al. | 707/100 |
| 2005/0091268 A1* | 4/2005 | Meyer et al. | 707/103 R |
| 2005/0102260 A1* | 5/2005 | Spring et al. | 707/1 |
| 2005/0186940 A1* | 8/2005 | Schatzberger et al. | 455/406 |
| 2006/0007311 A1* | 1/2006 | Watanabe | 348/158 |
| 2006/0069998 A1* | 3/2006 | Artman et al. | 715/721 |
| 2006/0142942 A1* | 6/2006 | Pyo | 701/211 |
| 2006/0159109 A1* | 7/2006 | Lamkin et al. | 370/401 |
| 2006/0253874 A1* | 11/2006 | Stark et al. | 725/62 |

(Continued)

FOREIGN PATENT DOCUMENTS

WO 20071436132 A2 12/2007
WO WO-2007143613 A2 12/2007

OTHER PUBLICATIONS

Microsoft Computer Dictionary; Fifth Edition; 2002.*

(Continued)

*Primary Examiner* — Mohammed R Uddin
(74) *Attorney, Agent, or Firm* — Norton Rose Fulbright US LLP

(57) ABSTRACT

Various media management techniques are described. A mobile computing device may comprise a metadata information database to store metadata, a media object database to store media objects, and a media content manager to couple to the metadata information database and the media object database. The media content manager may comprise a metadata manager to retrieve and associate metadata from the metadata information database with different media objects. The media content manager may further comprise a media object classifier to classify the media objects into hierarchical categories based on the metadata. The media content manager may still further comprise an album generator to generate a media album representing a hierarchical category. Other embodiments may be described and claimed.

18 Claims, 6 Drawing Sheets

(56) References Cited

U.S. PATENT DOCUMENTS

| | | | |
|---|---|---|---|
| 2007/0067373 A1* | 3/2007 | Higgins et al. | 707/206 |
| 2007/0126604 A1* | 6/2007 | Thacher | 340/995.13 |
| 2007/0150479 A1* | 6/2007 | Issa et al. | 707/10 |
| 2007/0155307 A1* | 7/2007 | Ng et al. | 455/3.01 |
| 2007/0214149 A1* | 9/2007 | Bodin et al. | 707/10 |
| 2007/0255807 A1* | 11/2007 | Hayashi et al. | 709/219 |
| 2007/0260704 A1* | 11/2007 | Sagoo et al. | 709/217 |
| 2008/0049782 A1* | 2/2008 | Nichols et al. | 370/466 |

OTHER PUBLICATIONS

Thumbnail—Wikipedia, the free encyclopedia.*

Alexander C. Loui; Automated Event Clustering and Quality Screening of Consumer Pictures for Digital Albuming; IEEE Transactions on Multimedia, vol. 5. No. Sep. 3, 2003.

Mor Naaman et al.;Context Data in Geo-Referenced Digital Photo Collections Proceedings of the ACM International Conference on Multimedia, New York, Oct. 10, 2004, pp. 196-203.

Mor Naaman et al.; Stanford University; Automatic Organization for Digial Photographs with Georgraphic Coordinates Digital Libraries 2004; Joint ACM/IE Conference.

Supplementary European Search Report—EP07784303, Search Authority—The Hague, Mar. 27, 2012 (142724EP).

* cited by examiner

TECHNIQUES FOR MANAGING MEDIA CONTENT

BACKGROUND

A mobile computing device such as a smart phone may incorporate various components into a single integrated device having a smaller form factor to enhance mobility and convenience. For example, the mobile computing device may have one or more radio transceivers and antennas for voice and/or data communications, one or more processors and memory units for computing operations, and various input/output devices, such as a digital camera, digital video camera, microphone, speaker, display, touch screen display, thumb board, keypad, and so forth. In addition, a mobile computing device may store and execute a growing number of system and application programs to support and utilize the various hardware components.

As a result of such enhanced capabilities, mobile computing devices are becoming increasingly used to create, store, and reproduce media content, including pictures, images, graphics, video files, audio files, and so forth. Furthermore, additional media content may be transferred to the mobile computing device from other devices using its communications capabilities. Memory resources are also decreasing in cost and therefore are readily available to store the media content. Consequently, mobile computing devices may be used to store increasing volumes of media content. A user may have some difficulty, however, organizing and navigating the ever increasing volumes of media content.

DETAILED DESCRIPTION

Figure 1:
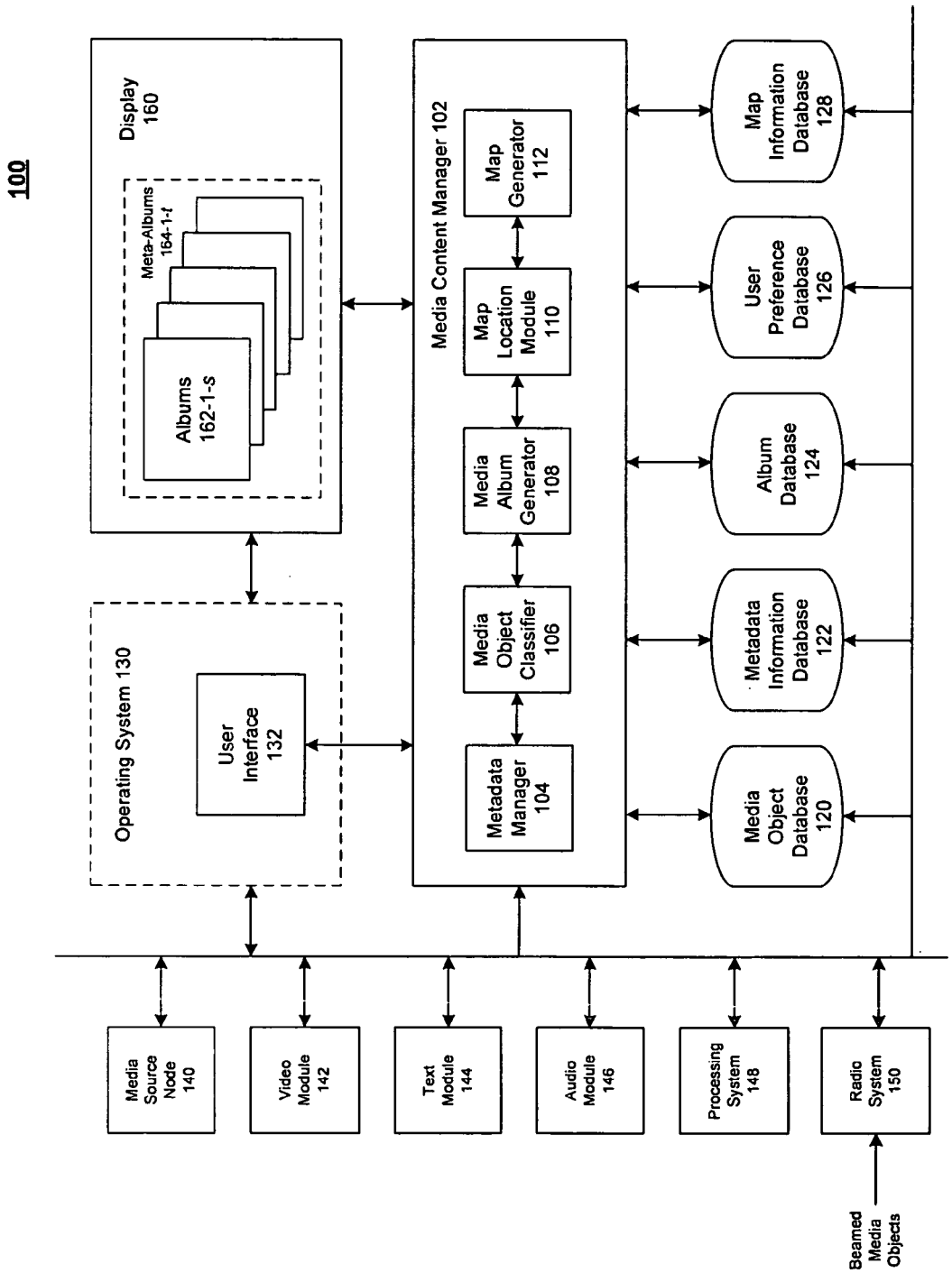
FIG. 1 illustrates one embodiment of a media content module.

Various embodiments may be directed to media management techniques in general. More particularly, various embodiments may be directed to media management techniques suitable for mobile computing devices. As mobile computing devices are used to store increasing volumes of media objects, it may become increasingly difficult to manage the media objects. For example, a user may need to manually organize related media objects. A user may then need to traverse a large number of media objects, sometimes using nested menu sets, in order to locate a desired media object. To potentially solve these and other problems, various embodiments may use media management techniques to automatically organize media objects to facilitate visual inspection and navigation of the media objects. This may allow a user to quickly traverse the volumes of media objects in order to locate a desired media object.

In one embodiment, for example, certain information in the form of metadata may be associated with various media objects. The metadata may be used to automatically group a set of media objects into predefined categories. The groupings may be arranged in a hierarchical manner based on a set of heuristics and/or user preferences. In some cases, an electronic map may be generated with a visual indicator of a location associated with a given set of media objects. In this manner, a user may realize improved navigation through volumes of media objects when attempting to access a particular media object or group of media objects. Accordingly, a user may directly benefit from enhanced products or services.

In one embodiment, for example, a mobile computing device may include a media content module to perform media management operations. The media content module may include a media content manager coupled to a media object database and a metadata information database. The media object database may store various types of media objects, such as audio files, video files, image files, and so forth. The metadata information database may store various types of metadata information, such as a time, date, location, user identifier, device identifier, media identifier, location identifier, and other types of information relevant or desirable for a given media object. The media content manager may include a metadata manager to retrieve metadata from the metadata information database, and associate the retrieved metadata with different media objects. A media object classifier may be used to classify the media objects into hierarchical categories based on the metadata. An album generator may be used to generate a media album representing each hierarchical category, or a media album collection representing a set of media albums. A map generator may be used to generate an electronic map with an image or metadata information representing a media object, media album, media album collection, or hierarchical category. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, application program interfaces (API), exchanging messages, and so forth.

FIG. 1 illustrates one embodiment of a media content module. FIG. 1 illustrates a media content module 100. Media content module 100 may perform media management operations to manage media content for a device. Media content module 100 may be implemented with any number of electronic systems, devices, or components. In one embodiment, for example, media content module 100 may be implemented with a mobile computing device. A mobile computing device may comprise any portable device having processing capabilities and communication capabilities. In some cases, a mobile computing device may have a form factor suitable for support and operation using a single human hand. An example of a mobile computing device suitable for use with media content module 100 may be described in more detail later with reference to FIG. 5, although the embodiments are not necessarily limited to this example.

As shown in FIG. 1, mobile content module 100 may comprise a media content manager 102. Media content manager 102 may perform various media management operations for media information, media content, media objects, media files, and so forth. Some examples of media management operations may include organizing media content, navigating media content, displaying media content, communicating media content, reproducing media content, collecting media content, reproducing media content, modifying media content, and so forth.

As further shown in FIG. 1, media content manager 102 may be coupled to various databases, including a media object database 120, a metadata information database 122, an album database 124, a user preference database 126, and a map information database 128. Media content manager 102 may also be coupled to an operating system 130 that includes, among other things, a user interface 132. Media content manager 102 and operating system 130 may be coupled to a display 160. Furthermore, the above elements may all be coupled to various elements typically included in a mobile computing device, such as a media source node 140, a video module 142, a text module 144, an audio module 146, a processing system 148, a radio system 150, and so forth. It may be appreciated that media content module 100 may be implemented with more or less elements than shown in FIG. 1 and still fall within the scope of the embodiments. The embodiments are not limited in this context.

In various embodiments, media object database 120 may store various media objects. A media object may generally refer to a conceptual entity approximately corresponding to a contiguous block computer memory of a specific size at a specific location. Examples of media objects may include various discrete or defined sets of media information, such as text information, alphanumeric information, audio information, graphics information, image information, animation information, video information, symbol information, icon information, and so forth. The media information may sometimes be stored as files, such as audio files, video files, image files, and so forth. The embodiments are not limited in this context.

In various embodiments, some media objects may be received from media source node 140. Media source node 140 may comprise any hardware or software element capable of creating, storing and/or delivering media objects to media content manager 102. Examples of media source node 140 may include a digital versatile disc (DVD) device, a video home system (VHS) device, a digital VHS device, a personal video recorder, a computer, a gaming console, a Compact Disc (CD) player, computer-readable or machine-readable memory, a digital camera, camcorder, video surveillance system, teleconferencing system, telephone system, medical and measuring instruments, scanner system, copier system, television system, digital television system, set top boxes, personal video records, server systems, computer systems, personal computer systems, digital audio devices (e.g., MP3 players), and so forth. It is worthy to note that media source node 140 may be internal or external to a mobile computing device using media content manager 102, depending upon a given implementation. When media source node 140 is external to a mobile computing device, the media objects may be communicated between media source node 140 and the mobile computing device over any suitable wired or wireless communications media. The embodiments are not limited in this context.

In various embodiments, metadata information database 122 may store various types of metadata information. Metadata information may generally refer to structure encoded data that describe characteristics of information-bearing entities to aid in the identification, discovery, assessment and management of described entities. In one embodiment, for example, metadata information database 122 may store metadata information that may be descriptive of, or provide context for, any media objects stored be media object database 120. Examples of metadata information relevant to media objects may include, but are not limited to, date information, time information, user identification information, device identification information, location information, event information, copyright information, content information, context information, owner information, legal rights information, media format information, and so forth. The metadata information may be gathered at the time of capture, such as when a media object is created (e.g., taking a picture) or received (e.g., from a media broadcasting device). The metadata information may also be gathered before or after a media object has been created or received. The embodiments are not limited in this context.

In various embodiments, album database 126 may store various media albums and media album collections. A media album may comprise a set of media objects from a defined category. A media album collection may comprise a set of media albums. Each media album and media album collection may be automatically generated and populated in accordance with a given set of rules and/or heuristics. Each media object may have a visual content indicator to allow a user to visually identify the content for a media object. Examples of visual content indicators may comprise an image, symbol, character, icon, text, number, or other desired information to convey information about the media object. A media album may display the visual content indicators as a common group, thereby allowing a user to quickly scan through the media objects for a given media album. A media album collection provides similar information regarding multiple media albums by decreasing the size of the visual content indicators to accommodate the available space of a given display, such as display 160, for example.

A media album may represent a set of media objects within the same defined category. The categories may include categories defined by a user or default categories. A user may define any number of categories. For example, assume a user defines a category named "cruise vacation." All media objects such as digital pictures classified within the "cruise vacation" category may be organized or stored within the same media album. In some cases, the categories may be related. In one embodiment, for example, the categories may be hierarchical in nature, where certain categories are subordinate to other categories. For example, more specific media albums named "2005 cruise vacation" and "2006 cruise vacation" may be subordinate to, or sub-categories of, the more general media album named "cruise vacation." Furthermore, the more general media album named "cruise vacation" may also comprise a media album collection since it includes multiple media albums "2005 cruise vacation" and "2006 cruise vacation."

In some embodiments, album database 124 may store the actual media objects for a given media album or media album collection. Alternatively, album database 124 may store a data structure or data format for a given album or media album collection, while the actual media objects remain as part of media object database 120. The embodiments are not limited in this context.

In various embodiments, user preference database 126 may store various user profiles. A user profile may include a set of user preferences to define the type of metadata information to be associated with a given media object. For example, a user may define various categories, category names, a name format for a media object, a name format for a media album or media album collection, a minimum media album size or media album collection size, a maximum media album size or media album collection size, a default map, a default city, a default map provider, certain metadata fields to include with a given media object or class of media objects, and other desired user defined information. The embodiments are not limited in this context.

In various embodiments, map information database 128 may store digital map information. Digital map information used by a mapping application to create an electronic map. The digital map information may be collected at the data-gathering survey level using, for example, a Geographic Information System (GIS). The digital map information may be provided by any number of map data providers, such as a NAVTEQ™ Corporation, Tele Atlas NV, and others. The digital map information may also be provided by various online mapping databases, such as electronic maps provided by Google™ Inc. or Yahoo!™ Inc., for example.

In one embodiment, for example, the digital map information may include map address information and location information. The map address information may refer to any information used to uniquely identify a place, such as a commercial building, personal residence, point of interest, and so forth. Examples of map address information may include country, state, zip code, county, street name, street number, and so forth. The location information may refer to any information used to uniquely identify a physical location for an address, such as latitude coordinates, longitude coordinates, altitude or elevation information, and so forth. The map address information and location information may have any desired level of granularity and detail as desired for a given implementation.

In various embodiments, media content manager 102 may include a metadata manager 104. Metadata manager 104 may be arranged to retrieve metadata information from metadata information database 122. Metadata manager 104 may associate the retrieved metadata information with different media objects stored by media object database 120 and/or album database 124. Metadata manager 104 may register or populate user data fields associated with each media object with certain metadata information. The user data fields may comprise predefined user data fields, user-defined user data fields, user data fields automatically generated by metadata manager 104 using a set of rules or heuristics, or other types of user data fields. The type of metadata to associate with a particular media object may be indicated by a set of user preferences stored with a user profile in user preference database 126. Metadata manager 104 may store the media objects and associated metadata using any desired data structure or data format in media object database 120.

In one embodiment, for example, metadata manager 104 may automatically register metadata information into predefined user data fields typically associated with a given media standard or format. For example, assume media source node 140 comprises a digital camera used to generate a Joint Photographic Experts Group (JPEG) image. Metadata manager 104 may embed various pieces of metadata information directly into the JPEG image, such as a current date and/or time, shooting conditions (e.g. whether a flash was used), camera settings (e.g., shutter, aperture, focal length), and so forth. Metadata manager 104 may also associate other metadata information with a JPEG image, such as an author, a title, a copyright notice, global positioning system (GPS) data, and so forth. Metadata manager 104 may embed or associate the desired metadata with the JPEG image in accordance with the Exchangeable Image File Format (EXIF). Some EXIF field names and descriptions may be provided in Table 1 as follows:

TABLE 1

| Name | Description |
| --- | --- |
| NewSubfileType | Subfile type |
| ImageWidth | Image width |
| ImageLength | Image height |
| BitsPerSample | Number of bits per component |
| Compression | Compression scheme |
| PhotometricInterpretation | Pixel composition |
| ImageDescription | Image title |
| Make | Manufacturer of image input equipment |
| Model | Model of image input equipment |
| StripOffsets | Image data location |
| Orientation | Orientation of image |
| SamplesPerPixel | Number of components |
| RowsPerStrip | Number of rows per strip |
| StripByteCounts | Bytes per compressed strip |
| XResolution | Image resolution in width direction |
| YResolution | Image resolution in height direction |
| PlanarConfiguration | Image data arrangement |
| ResolutionUnit | Unit of X and Y resolution |
| TransferFunction | Transfer function |
| Software | Software used |
| DateTime | File change date and time |
| Artist | Person who created the image |
| HostComputer | The computer and/or operating system in use |
| WhitePoint | White point chromaticity |
| PrimaryChromaticities | Chromaticities of primaries |
| JPEGInterchangeFormat | Offset to JPEG SOI |
| JPEGInterchangeFormatLength | Bytes of JPEG data |
| YCbCrCoefficients | Color space transformation matrix coefficients |
| YCbCrSubSampling | Subsampling ratio of Y to C |
| YCbCrPositioning | Y and C positioning |
| ReferenceBlackWhite | Pair of black and white reference values |
| Copyright | Copyright holder |
| ExifTag | Exif IFD Pointer |
| GPSTag | GPSInfo IFD Pointer |
| ExposureTime | Exposure time |
| FNumber | F number |
| ExposureProgram | Exposure program |
| SpectralSensitivity | Spectral sensitivity |
| ISOSpeedRatings | ISO speed ratings |
| OECF | Optoelectric coefficient |
| ExifVersion | Exif Version |
| DateTimeOriginal | Date and time original image was generated |
| DateTimeDigitized | Date and time image was made digital data |
| ComponentsConfiguration | Meaning of each component |
| CompressedBitsPerPixel | Image compression mode |
| ShutterSpeedValue | Shutter speed |
| ApertureValue | Aperture |
| BrightnessValue | Brightness |
| ExposureBiasValue | Exposure bias |
| MaxApertureValue | Maximum lens aperture |
| SubjectDistance | Subject distance |
| MeteringMode | Metering mode |
| LightSource | Light source |
| Flash | Flash |
| FocalLength | Lens focal length |
| SubjectArea | Subject area |
| MakerNote | Manufacturer notes |
| UserComment | User comments |
| SubSecTime | DateTime subseconds |
| SubSecTimeOriginal | DateTimeOriginal subseconds |

TABLE 1-continued

| Name | Description |
| --- | --- |
| SubSecTimeDigitized | DateTimeDigitized subseconds |
| FlashpixVersion | Supported Flashpix version |
| ColorSpace | Color space information |
| PixelXDimension | Valid image width |
| PixelYDimension | Valid image height |
| RelatedSoundFile | Related audio file |
| InteroperabilityTag | Interoperability IFD Pointer |
| FlashEnergy | Flash energy |
| SpatialFrequencyResponse | Spatial frequency response |
| FocalPlaneXResolution | Focal plane X resolution |
| FocalPlaneYResolution | Focal plane Y resolution |
| FocalPlaneResolutionUnit | Focal plane resolution unit |
| SubjectLocation | Subject location |
| ExposureIndex | Exposure index |
| SensingMethod | Sensing method |
| FileSource | File source |
| SceneType | Scene type |
| CFAPattern | CFA pattern |
| CustomRendered | Custom image processing |
| ExposureMode | Exposure mode |
| WhiteBalance | White balance |
| DigitalZoomRatio | Digital zoom ratio |
| FocalLengthIn35mmFilm | Focal length in 35 mm film |
| SceneCaptureType | Scene capture type |
| GainControl | Gain control |
| Contrast | Contrast |
| Saturation | Saturation |
| Sharpness | Sharpness |
| DeviceSettingDescription | Device settings description |
| SubjectDistanceRange | Subject distance range |
| ImageUniqueID | Unique image ID |
| RelatedImageFileFormat | File format of image file |
| RelatedImageWidth | Image width |
| RelatedImageLength | Image height |
| GPSVersionID | GPS tag version |
| GPSLatitudeRef | North or South Latitude |
| GPSLatitude | Latitude |
| GPSLongitudeRef | East or West Longitude |
| GPSLongitude | Longitude |
| GPSAltitudeRef | Altitude reference |
| GPSAltitude | Altitude |
| GPSTimeStamp | GPS time (atomic clock) |
| GPSSatellites | GPS satellites used for measurement |
| GPSStatus | GPS receiver status |
| GPSMeasureMode | GPS measurement mode |
| GPSDOP | Measurement precision |
| GPSSpeedRef | Speed unit |
| GPSSpeed | Speed of GPS receiver |
| GPSTrackRef | Reference for direction of movement |
| GPSTrack | Direction of movement |
| GPSImgDirectionRef | Reference for direction of image |
| GPSImgDirection | Direction of image |
| GPSMapDatum | Geodetic survey data used |
| GPSDestLatitudeRef | Reference for latitude of destination |
| GPSDestLatitude | Latitude of destination |
| GPSDestLongitudeRef | Reference for longitude of destination |
| GPSDestLongitude | Longitude of destination |
| GPSDestBearingRef | Reference for bearing of destination |
| GPSDestBearing | Bearing of destination |
| GPSDestDistanceRef | Reference for distance to destination |
| GPSDestDistance | Distance to destination |
| GPSProcessingMethod | Name of GPS processing method |
| GPSAreaInformation | Name of GPS area |
| GPSDateStamp | GPS date |
| GPSDifferential | GPS differential correction |

It may be appreciated that the EXIF user data format in general and the fields provided in Table 1 in particular are provided by way of example only. Any number of user data formats and fields for metadata information may be defined as desired for a given implementation. The embodiments are not limited in this context.

In various embodiments, media content manager 102 may include a media object classifier 106 coupled to metadata manager 104. Media object classifier 106 may be arranged to classify the media objects into categories based on the metadata information associated with the media objects. In some cases, for example, the categories may be arranged as hierarchical categories. Media object classifier 106 may search media object database 120 to organize the stored media objects by the associated metadata. Media object classifier 106 may organize the media objects into various predefined categories, user-defined categories as indicated by a set of user preferences, or categories automatically generated by media object classifier 106 using a set of rules or heuristics. In the latter case, for example, media object classifier may create a new category when user data fields for two or more media objects have common metadata.

By way of example, assume that a set of media objects have a user data field with date information such as a month and year. Further assume that month and year categories have been defined for media object classifier 106. Media object classifier may then search media object database 120 and classify a first set of media objects having a user data field with a date of "January 2006" into a first category labeled "January 2006," a second set of media objects having a user data field with a date of "February 2006" into a second category labeled "February 2006," and so forth for each month of the year 2006.

In various embodiments, media content manager 102 may include an album generator 108 coupled to media object classifier 106. Album generator 108 may be arranged to generate a media album representing a hierarchical category. Album generator 108 may also be arranged to generate a media album collection comprising multiple media albums. Album generator 108 may retrieve a set of media album parameters used to generate one or more media albums or media album collections. The media album parameters may be retrieved from a set of user preferences stored with a user profile, for example. Examples of media album parameters include a maximum album size, minimum album size, priority level, media album image, media album identifier, and so forth. In accordance with the media album parameters, album generator 108 may automatically organize media objects into one or more media albums 162-1-s based on the hierarchical categories used by media object classifier 106. Furthermore, album generator 108 may automatically organize multiple media albums 161-1-s into one or more media album collections 164-1-t. Album generator 108 may store the media albums 162-1-s and media album collections 164-1-t in album database 124. It may be appreciated that the media objects may be moved or copied from media object database 120 to album database 124, or alternatively, remain in media object database 120 with the appropriate lists, references, or pointers for each media album 162-1-s and media album collections 164-1-t stored in album database 124. The embodiments are not limited in this context.

In various embodiments, media content manager 102 may be coupled to a user interface application 132 and a display 160. In one embodiment, for example, user interface application 132 may be implemented as a graphics user interface (GUI) application. User interface application 132 may display multiple visual content indicators (e.g., thumbnail images) for the hierarchical categories grouped in a media album 162-1-s on display 160. User interface application 312 may also display multiple media albums for the hierarchical categories grouped in one or more media album collections 164-1-t on display 160.

As previously described, each media object may be represented using a visual content indicator, such as an image, icon, symbol, or other visually descriptive indicator. In one embodiment, for example, the metadata for each media object may include a thumbnail image to assist a user to visually recognize a content for a given media album. User interface application 132 may display each media album 162-1-s with a collection of thumbnail images representing the underlying set of media objects that form the media album 162-1-s. In this manner, a user may navigate between media albums 162-1-s by visually searching the thumbnail images.

Furthermore, user interface application 132 may display a set of media albums 162-1-s in a media album collection 164-1-t. This may result in a further reduction in image size for media albums 162-1-s and the thumbnail images. The use of media album collections 164-1-t may allow more media albums 162-1-s and thumbnail images to be presented to a user, at the cost of reduced image size. Although details for individual pictures may not be necessarily visible, a user may still visually recognize sufficient image details for navigating and selecting a desired media album 162-1-s. As a result, media content manager 102 may automatically create a visual hierarchy for the media objects to ease navigation and use by a user. To improve navigation, media content manager 102 may keep the number of pictures per album between a user-specified minimum and maximum, and automatically generate and insert levels in the visual hierarchy based on an overall number of media objects or time frame for certain media objects (e.g., taken during a particular day, week, month, year, and so forth).

In various embodiments, media content manager 102 may include a map location module 110 coupled to album generator 108. In one embodiment, for example, map location module 110 may be arranged to generate or define location information for a given location in response to user input. The location information may be used, for example, as metadata for association with a media object. Map location module 110 may generate the location information using a number of different techniques. For example, map location module 110 may generate the location information using a location device. Examples of location devices may include a GPS system with a GPS transceiver, a cellular triangulation system, and so forth. A cellular triangulation system may generate location information using one or more triangulation techniques capable of triangulating a position based on one or more known coordinates, such as cell data as used in cellular radiotelephone systems. In another example, map location module 110 may generate location information from user input, such as entering coordinates or tapping on a map via user interface application 132. Once map location module 110 receives the location information, map location module 110 may store the location information as metadata in metadata information database 122 and/or map information in map information database 128.

In addition to generating the location information using resources resident on a mobile computing device, map location module 110 may also generate the location information using resources outside of the mobile computing device. Map location module 110 may send a request for location information to an external device. Examples of an external device may comprise a GPS device, cellular triangulation device, and others. In one embodiment, for example, the external device may be accessible via a wireless access point and a network. For example, the external device may reside on a server accessible via the Internet. The external device may receive the request from the mobile computing device, and compute the current location of the mobile computing device. The external device may send the current location information to the mobile computing device. The mobile computing device may receive the location information, and forward the location information to map location module 110.

In various embodiments, media content manager 102 may include a map generator 112 coupled to map location module 110. Map generator 112 may be arranged to generate electronic maps. Map generator 112 may be implemented using an application program such as a mapping application. Map generator 112 may create an electronic map using digital map information stored in map information database 128, for example. Map generator 112 may be interactive, such as allowing a user to adjust the level of detail displayed for the electronic map. For example, a user may typically increase or decrease the scale of a map (e.g., zoom in or zoom out) and therefore a corresponding amount of map detail. Zoom operations may be performed using a number of different techniques, such as replacing a map with a more detailed map, enlarging the same map without enlarging the pixels thereby showing more detail, enlarging the same map with the pixels enlarged (e.g., replaced by rectangles of pixels), using interpolation techniques, and so forth. Map generator 112 may perform any number of additional mapping operations, such as geocoding operations, display operations, routing operations, navigation operations, and so forth. In various embodiments, map generator 112 may be a local application implemented on a mobile computing device, a network based mapping application (e.g., Internet maps), or a combination of both. The embodiments are not limited in this context.

In one embodiment, map generator 112 may be arranged to generate an electronic map with digital map information. The digital map information may be stored as part of internal map information database 128, or some external database, such as an online network database for example. Map generator 112 may position an image for a media object on the electronic map using location information associated with the media object. The location information may be derived from map location module 112 and/or media source node 140, for example. Map generator 112 may display a visual content indicator (e.g., thumbnail image) for a single media object, a media album 162-1-s, or a media album collection 164-1-t, on a location indicated by the relevant location information. Map generator 112 may also display other associated metadata for one or more media objects on the electronic map as well. The electronic map may show all information available for a given media object or set of media objects, or limit the displayed information based on filtering parameters. Examples of filtering parameters may include any metadata information, such as date ranges (e.g., last 6 months), account name, keywords, calendar events, and so forth. The filtering parameters may be, for example, user-defined and stored in user preference database 128.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 2:
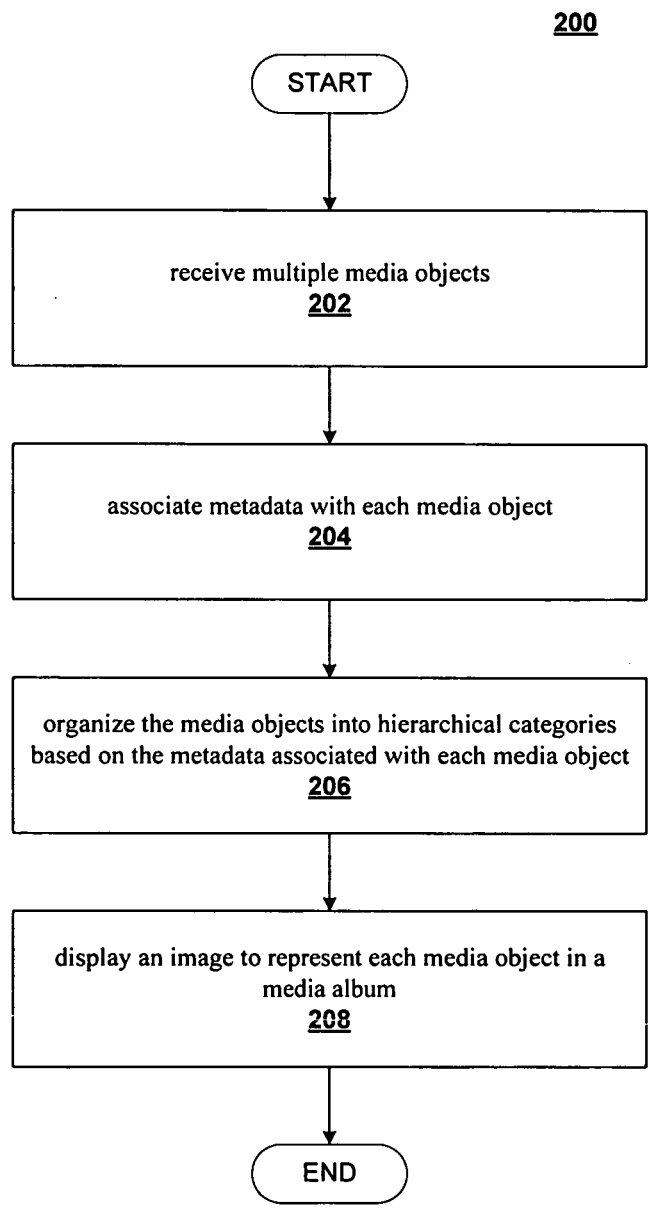
FIG. 2 illustrates one embodiment of a logic diagram.

FIG. 2 illustrates one embodiment of a logic flow. FIG. 2 illustrates a logic flow 200. Logic flow 200 may be representative of the operations executed by one or more embodiments described herein, such as media content manager 102. As shown in logic flow 200, multiple media objects may be received at block 202. Metadata may be associated with each media object at block 204. The media objects may be organized into hierarchical categories based on the metadata associated with each media object at block 206. An image to represent each media object may be displayed in a media album at block 208.

In one embodiment, the media objects may be organized into the hierarchical categories with location information as the metadata. The embodiments are not limited in this context.

In one embodiment, multiple images for the hierarchical categories may be displayed in a media album. Multiple media albums for the hierarchical categories may be displayed in a media album collection. The embodiments are not limited in this context.

In one embodiment, a set of user preferences to define metadata associated with a given media object may be retrieved from a user profile. The embodiments are not limited in this context.

In one embodiment, a map may be generated with an image for a media object positioned on the map using location information associated with the media object. The embodiments are not limited in this context.

Figure 3:
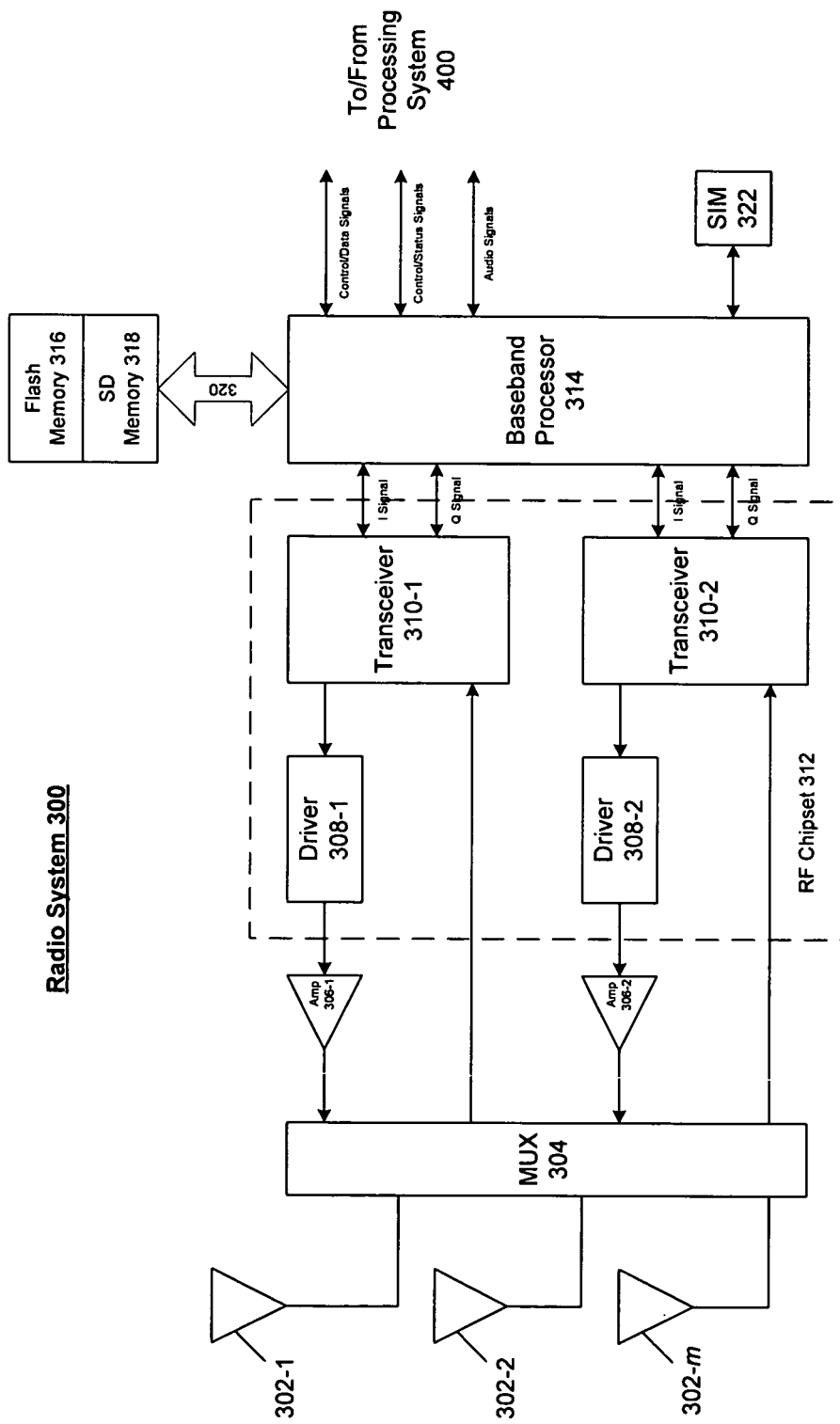
FIG. 3 illustrates one embodiment of a radio system.

FIG. 3 illustrates one embodiment a radio system. FIG. 3 illustrates a more detailed block diagram of a radio system 150 as described with reference to FIG. 1. Radio system 150 may perform voice and data communication operations for mobile computing device 500 as described with reference to FIG. 5. For example, radio system 150 may be arranged to communicate voice information and control information over one or more assigned frequency bands of wireless shared media 122-1. The embodiments are not meant to be limited, however, to the example given in FIG. 3.

In various embodiments, radio system 150 may include one or more antennas 302-1-*m*. Antennas 302-1-*m* may be used for transmitting and/or receiving electrical signals. Examples for antennas 302-1-*m* may include an internal antenna, an omni-directional antenna, a monopole antenna, a dipole antenna, an end fed antenna, a circularly polarized antenna, a micro-strip antenna, a diversity antenna, a dual antenna, an antenna array, a helical antenna, and so forth. During transmission, antennas 302-1-*m* may accept energy from a transmission line and radiate this energy into space via wireless shared media 122-1. During reception, antennas 302-1-*m* may gather energy from an incident wave received over wireless shared media 122-1, and provide this energy to a corresponding transmission line. The amount of power radiated from or received by antennas 302-1-*m* is typically described in terms of gain. Radio system 150 may be implemented using a single antenna 302-1, or using an array of antennas 302-1-*m* array, such as a quad band antenna array, for example. Multiple antennas may be desirable when implementing spatial diversity and/or Multiple-Input-Multiple-Output (MIMO) systems. The embodiments are not limited in this context.

In various embodiments, antennas 302-1-*m* may be connected to a multiplexer 304. Multiplexer 304 multiplexes signals from power amplifiers 306-1, 306-2 for delivery to antennas 302-1-*m*. Multiplexer 304 demultiplexes signals received from antennas 302-1-*m* for delivery to RF chipset 312. The embodiments are not limited in this context.

In various embodiments, multiplexer 304 may be connected to power amplifiers 306-1, 306-2. Power amplifiers 306-1, 306-2 may be used to amplify any signals to be transmitted over wireless shared media 122-1. Power amplifiers 306-1, 306-2 may work in all assigned frequency bands, such as 4 frequency bands in a quad-band system. Power amplifiers 306-1, 306-2 may also operate in various modulation modes, such as Gaussian Minimum Shift Keying (GSMK) modulation suitable for GSM systems, 8-ary Phase Shift Keying (8-PSK) modulation suitable for EDGE systems, 16 Quadrature Amplitude Module (QAM) and/or Quadrature Phase Shift Keying (QPSK) for HSDPA, and so forth. The embodiments are not limited in this context.

In various embodiments, power amplifiers 306-1, 306-2 may be connected to an RF chipset 312. RF chipset 312 may also be connected to multiplexer 304. In one embodiment, for example, RF chipset 312 may comprise one or more transceivers in a transceiver array. For example, RF chipset 312 may include RF drivers 308-1, 308-2 each coupled to RF transceivers 310-1, 310-2, respectively. RF chipset 312 may perform modulation and direct conversion operations required for GMSK and 8-PSK signal types for quad-band E-GPRS radio, for example. RF chipset 312 receives analog I & Q signals from a baseband processor 314, and converts them to an RF signal suitable for amplification by power amplifiers 306-1, 306-2. Similarly, RF chipset 312 converts the signals received from wireless shared media 122-1 via antennas 302-1-*m* and multiplexer 304 to analog I & Q signals to be sent to baseband processor 314. RF chipset 312 may be implemented using one or more chips as desired for a given implementation. The embodiments are not limited in this context.

In some embodiments, each transceiver 310-1, 310-2 may be arranged to perform data communications in accordance with a different set of wireless communications protocols and techniques. In one embodiment, for example, transceiver 310-1 may be arranged to communicate information in accordance with a first class of wireless communications protocols and techniques that are generally associated with cellular radiotelephone communication systems. Examples of the first class of protocols may include WWAN protocols, such as GSM/GPRS protocols, CDMA/1xRTT protocols, EDGE protocols, EV-DO protocols, EV-DV protocols, HSDPA protocols, and so forth. In one embodiment, for example, transceiver 310-2 may be arranged to communicate information in accordance with a second class of wireless communications protocols and techniques that are generally associated with a computer network. Examples of the second class of protocols may include WLAN protocols, such as one or more of the IEEE 802.xx series of protocols, such as IEEE 802.11a/b/g/n, IEEE 802.16, IEEE 802.20, and so forth. Other examples of the second class of protocols may include PAN protocols, Infrared protocols, Bluetooth protocols, EMI protocols including passive or active RFID protocols, and so forth. It may be appreciated that although the various protocols have been generally separated into a first class and a second class, it may be appreciated that transceivers 310-1, 310-2 may be arranged to use any type of protocol from either class as desired for a given implementation. It may also be appreciated that although RF chipset 312 is shown with two transceivers 310-1, 310-2 by way of example, RF chipset 312 may be implemented using more or less transceivers as desired for a given implementation. The embodiments are not limited in this respect.

In various embodiments, RF chipset 312 may be connected to baseband processor 314. Baseband processor 314 may perform baseband operations for radio system 150. Baseband processor 314 may comprise both analog and digital baseband sections. The analog baseband section includes I & Q filters, analog-to-digital converters, digital-to-analog converters, audio circuits, and other circuits. The digital baseband section may include one or more encoders, decoders, equalizers/demodulators, GMSK modulators, GPRS ciphers, transceiver controls, automatic frequency control (AFC), automatic gain control (AGC), power amplifier (PA) ramp control, and other circuits. The embodiments are not limited in this context.

In various embodiments, baseband processor 314 may also be connected to one or more memory units via a memory bus 320. In one embodiment, for example, baseband processor 314 may be connected to a flash memory unit 316 and a secure digital (SD) memory unit 318. Memory units 316, 318 may be removable or non-removable memory. In one embodiment, for example, baseband processor 314 may use approximately 1.6 megabytes of static read-only memory (SRAM) for E-GPRS and other protocol stack needs.

In various embodiments, baseband processor 314 may also be connected to a subscriber identity module (SIM) 322. Baseband processor 314 may have a SIM interface for SIM 322. SIM 322 may comprise a smart card that encrypts voice and data transmissions and stores data about the specific user so that the user can be identified and authenticated to the network supplying voice or data communications. SIM 322 may also store data such as personal phone settings specific to the user and phone numbers. SIM 322 can be removable or non-removable. The embodiments are not limited in this context.

In various embodiments, baseband processor 314 may further include various interfaces for communicating with a host processor of processing system 148. For example, baseband processor 314 may have one or more universal asynchronous receiver-transmitter (UART) interfaces, one or more control/status lines to the host processor, one or more control/data lines to the host processor, and one or more audio lines to communicate audio signals to an audio sub-system of processing system 148. The embodiments are not limited in this context.

Figure 4:
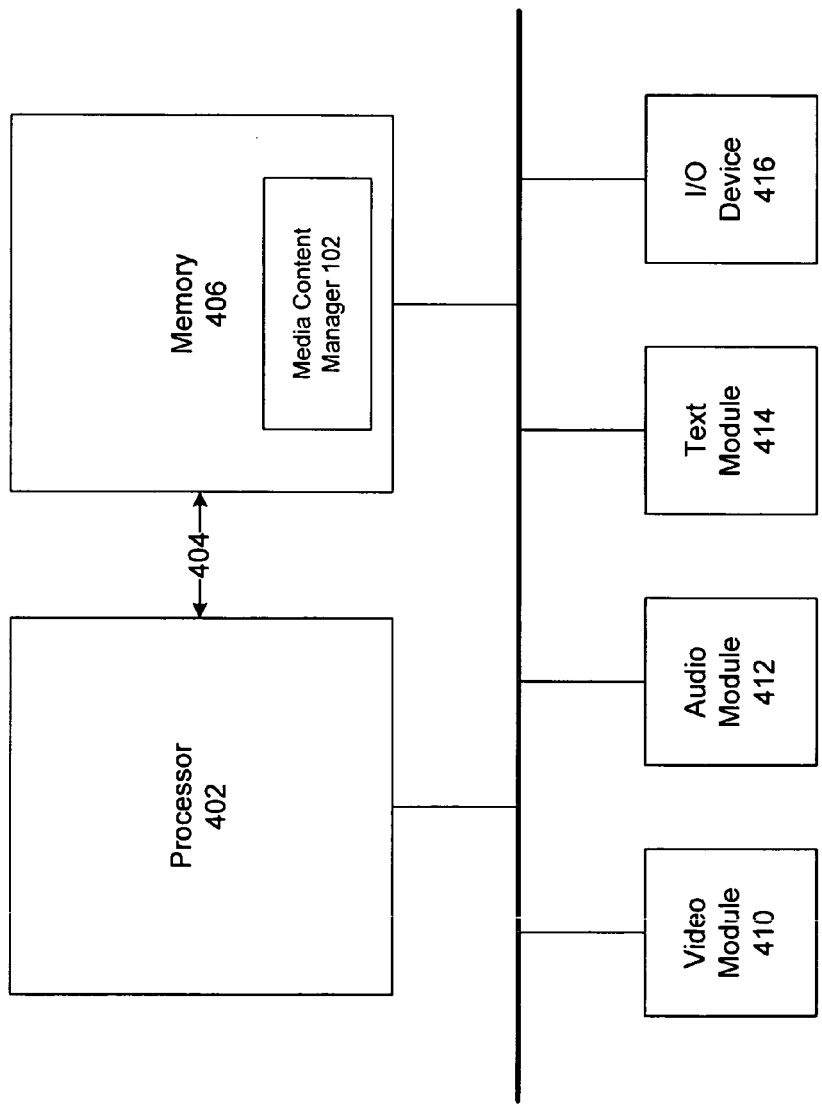
FIG. 4 illustrates one embodiment of a processing system.

FIG. 4 illustrates one embodiment a processing system. FIG. 4 illustrates a more detailed block diagram of processing system 148 as described with reference to FIG. 1. Processing system 148 may provide computing or processing operations for mobile computing device 500. For example, processing system 148 may be arranged to execute various software programs for mobile computing device 500. Although processing system 148 may be used to implement certain operations for various embodiments as software executed by a processor, it may be appreciated that the operations performed by processing system 148 may also be implemented using hardware circuits or structures, or a combination of hardware and software, as desired for a particular implementation. The embodiments are not limited in this context.

In various embodiments, mobile computing device 500 may be capable of executing various types of software programs using processing system 148. Software programs may be generally grouped into application programs and system programs. Application programs allow a user to accomplish one or more specific tasks. Typical applications include office suites, business software, educational software, databases, communications software, computer games, and so forth. Examples of application programs may include mail programs, web browsers, personal information manager applications, calendar programs, scheduling programs, contact management programs, gaming programs, word processing programs, spreadsheet programs, picture management programs, video reproduction programs, audio reproduction programs, groupware programs, and so forth. Most application software has a graphical user interface (GUI) to communicate information between a device and a user. System programs assists in the running of a computer system. System programs may be directly responsible for controlling, integrating, and managing the individual hardware components of the computer system. Examples of system programs may include operating systems (OS), device drivers, programming tools, utility programs, software libraries, interfaces, program interfaces, API, and so forth.

In various embodiments, processing system 148 of mobile computing device 500 may be capable of executing various types of system programs, such as OS 130. In computing, an OS is the system software responsible for the direct control and management of hardware and basic system operations. Additionally, it provides a foundation upon which to run application software such as word processing programs and web browsers. Mobile computing device 500 may utilize any OS suitable for smaller form factor devices, such as a Palm OS®, Palm OS® Cobalt, Microsoft Windows® CE, Microsoft Pocket PC, Symbian OS™, Embedix OS, Linux, and others. The embodiments are not limited in this context.

In various embodiments, processing system 148 may include various elements potentially useful in creating a memo. As shown in FIG. 4, processing system 148 may include a video module 142, a text module 144, an audio module 146, and an I/O module 416. Elements 142, 144, 146, and 416 may have various sub-elements needed to create a media object for a particular modality or input. For example, video module 142 may be used to form a video media object, and may include a camera, a microphone, a speaker, a video coder/decoder (codec), a video player, and so forth. Audio module 146 may be used to form an audio media object, and may include a microphone, a speaker, an audio codec, an audio player, and so forth. Text module 144 may be used to form a text media object, and may include a text interface, such as a handwriting recognizer, a keyboard, an alphanumeric keypad such as used in cellular telephones, a touch screen, a mouse, a pointing device, cursor control, hard buttons, soft buttons, switches, and so forth. I/O device 416 may include any desired input and output elements that may be accessible or shared by elements of mobile computing device 500, such as video module 142, text module 144, and/or audio module 146. For example, I/O module 416 may include a thumb keyboard, a four-way navigation button, dedicated hardware buttons or switches, a camera, a microphone, a speaker, a display, a touch screen, and so forth.

In various embodiments, processing system 148 may include processor 402. Processor 402 may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 402 may be implemented as a general purpose processor, such as a processor made by Intel® Corporation, Santa Clara, Calif. Processor 402 may also be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. The embodiments, however, are not limited in this context.

In one embodiment, processing system 148 may include memory 406 to connect to processor 402. Memory 406 may be implemented using any machine-readable or computer-readable media capable of storing data, including both volatile and non-volatile memory. For example, memory 406 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 406 may be included on the same integrated circuit as processor 402 thereby obviating the need for bus 404. Alternatively some portion or all of memory 406 may be disposed on an integrated circuit or other medium, for example a hard disk drive, that is external to the integrated circuit of processor 402, and processor 402 may access memory 406 via memory bus 404. The embodiments are not limited in this context.

In various embodiments, memory 406 may store one or more software components. A software component may refer to one or more programs, or a portion of a program, used to implement a discrete set of operations. In one embodiment, for example, memory 406 may include one or more software components, such as media content module 100 and/or media content manager 102, as previously described. It is worthy to note that although some embodiments may describe some or all of media content module 100 and/or media content manager 102 as software components executed by processing system 148, it may be appreciated that some or all of the operations of the software components may be implemented using other processors accessible by mobile computing device 500, such as baseband processor 314, for example. Furthermore, these modules may also be implemented using dedicated hardware circuits or structures, or a combination of dedicated hardware and software, as desired for a given implementation. The embodiments are not limited in this context.

Figure 5:
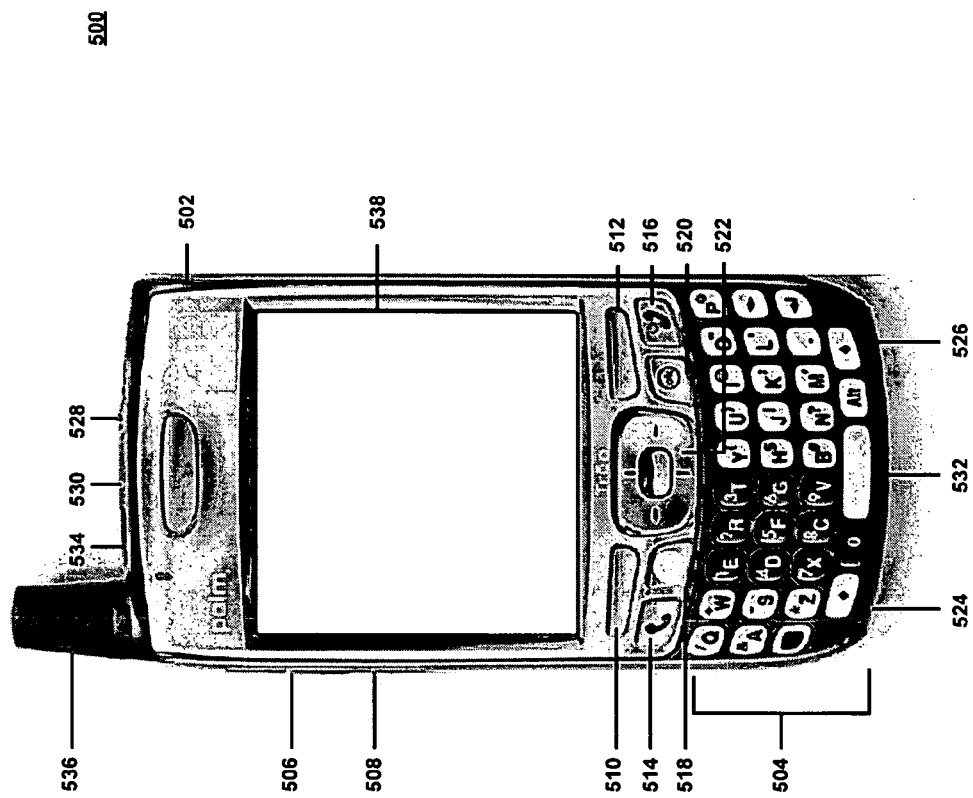
FIG. 5 illustrates one embodiment of a mobile computing device.

FIG. 5 illustrates one embodiment of a mobile computing device 500. Mobile computing device 500 may comprise any computing device having a radio transceiver and a self-contained power source, such as a battery, for example. Examples of a mobile computing device may include a computer, laptop computer, ultra-laptop computer, portable computer, handheld computer, palmtop computer, personal digital assistant (PDA), cellular telephone, combination cellular telephone/PDA, smart phone, pager, one-way pager, two-way pager, messaging device, data communication device, and so forth. Examples of a mobile computing device may also include computers that are arranged to be worn by a person, such as a wrist computer, finger computer, ring computer, eyeglass computer, belt-clip computer, arm-band computer, shoe computers, clothing computers, and other wearable computers. The embodiments are not limited in this context.

As shown in FIG. 5, mobile computing device 500 may be implemented as a combination handheld computer and mobile telephone, sometimes referred to as a smart phone. Examples of a mobile computing device may include one or more Palm® products made by Palm Inc. of Sunnyvale, Calif., such as the Palm Treo™ line of smart phones and variants. Although some embodiments may be described with mobile computing device 500 implemented as a smart phone by way of example, it may be appreciated that the embodiments are not limited in this context.

Mobile computing device 500 may comprise a housing 502. Housing 502 may include one or more materials such as plastic, metal, ceramic, glass, carbon fiber, various polymers, and so forth, suitable for enclosing and protecting the internal components of mobile computing device 500. Housing 502 may be used to encapsulate various internal components for mobile computing device 500, such as a processor, a memory, one or more transceivers, one or more printed circuit board (PCB), one or more antennas, a stylus, and so forth. In one embodiment, housing 502 may have a shape, size and/or form factor capable of being held with an average human hand, such as a handheld computer, cellular telephone, PDA, combination PDA/cellular telephone, smart phone, and so forth.

Mobile computing device 500 may comprise various input/output (I/O) devices, such as an alphanumeric keyboard, alphanumeric keypad, thumb board, numeric keys, keys, buttons, switches, rocker switches, multi-directional rocker switches, a microphone, an audio headset, a camera, a touch-sensitive display screen, a stylus, and so forth. As shown in FIG. 5, for example, mobile computing device 500 may comprise a thumb board 504 having a QWERTY key layout and an integrated number dial pad. Mobile computing device 500 may comprise various buttons such as, for example, a volume button 506, a customizable button 508, a left action button 510, a right action button 512, a phone/send button 514, a power/end button 516, a start button 518, an OK button 520, and a navigation button 522. Mobile computing device 500 may comprise an audio port 524 to connect an audio headset, a microphone 526, a ringer on/off switch 528 having a vibrate mode, and an expansion slot 530 to support a multimedia and/or memory card, for example.

Mobile computing device 500 may comprise a serial connection port 532, an infrared port 534, integrated Bluetooth® wireless capability, and/or integrated 802.11x (WiFi) wireless capability, to enable wired (e.g., USB cable) and/or wireless connection to another device, such as a local personal computer (PC) or a wireless access point. In various implementations, mobile computing device 500 may be arranged to transfer and/or synchronize information with the local computer system. Mobile computing device 500 also may comprise a rechargeable battery, such as a removable and rechargeable lithium ion battery, and an alternating current (AC) adapter.

Mobile computing device 500 may comprise a display 538. Display 538 may be representative of, for example, display 160 as described with reference to FIG. 1. Display 538 may comprise any suitable display unit for displaying information appropriate for a mobile computing device. In addition, display 538 may be implemented as an additional I/O device, such as a touch screen, touch panel, touch screen panel, and so forth. Touch screens are display overlays which are implemented using one of several different techniques, such as pressure-sensitive (resistive) techniques, electrically-sensitive (capacitive) techniques, acoustically-sensitive (surface acoustic wave) techniques, photo-sensitive (infra-red) techniques, and so forth. The effect of such overlays allows a display to be used as an input device, to remove or enhance the keyboard and/or the mouse as the primary input device for interacting with content provided on display 538.

In one embodiment, for example, display 538 may be implemented by a liquid crystal display (LCD) or other type of suitable visual interface. Display 538 may comprise, for example, a touch-sensitive color (e.g., 56-bit color) display screen. In various implementations, the display 538 may comprise one or more thin-film transistors (TFT) LCD including embedded transistors. In such implementations, the display 538 may comprise a transistor for each pixel to implement an active matrix. While the embodiments are not limited in this context, an active matrix display is desirable since it requires lower current to trigger pixel illumination and is more responsive to change than a passive matrix.

Mobile computing device 500 may comprise an antenna system including one or more antennas. The antennas may be internal antennas, external antennas, or a combination of both. In one embodiment, for example, the antenna system may include an external antenna 536 implemented as a stub antenna, a whip antenna, an extendable antenna, and so forth. The antenna system may also include one or more internal antennas, such as a planar inverted-F antenna, a planar inverted-L antenna, an inverted-F antenna with a helical structure, an inverted-L antenna with a helical structure, a monopole antenna, a meandered monopole antenna, a dipole antenna, a balanced antenna, a printed helical antenna, a chip antenna, a ceramic antenna, and so forth. The embodiments are not limited in this context.

Mobile computing device 500 may use multiple transceivers coupled to the antenna system. Mobile computing device 500 may include multiple transceivers, with each transceiver arranged to communicate using different types of protocols, communication ranges, operating power requirements, radio-frequency (RF) sub-bands, information types (e.g., voice or data), use scenarios, applications, and so forth. In one embodiment, for example, mobile computing device 500 may include at least three types of transceivers, including a cellular radiotelephone system transceiver for voice communications, a wireless networking transceiver for longer range data communications (and possibly voice communications), and a personal area network transceiver for shorter range data communications. In some cases, for example, the multiple transceivers may have overlapping transmit and/or receive bands.

Figure 6:
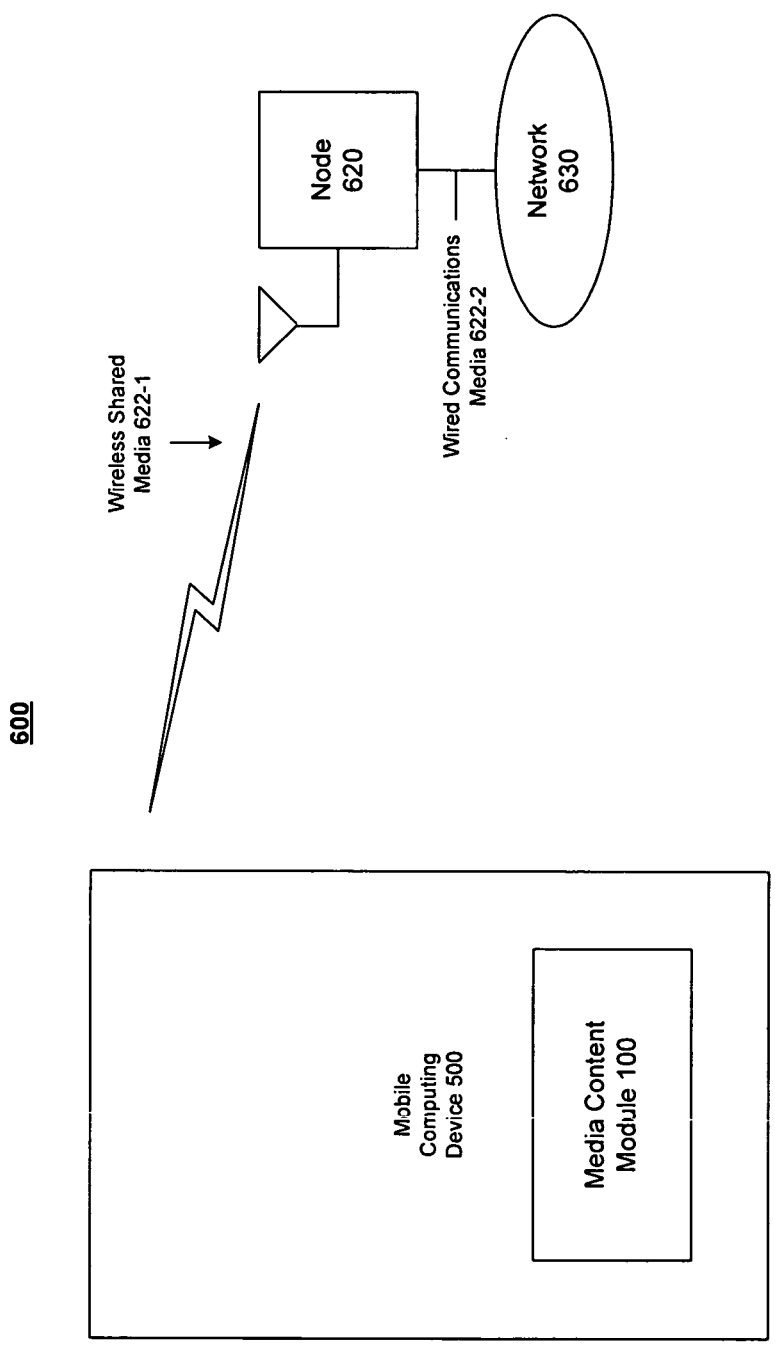
FIG. 6 illustrates one embodiment of a communications system.

FIG. 6 illustrates one embodiment of a communications system 600. Communications system 600 may be suitable for use with various embodiments as described herein, including mobile computing device 500. In various embodiments, communications system 600 may be implemented as a wireless communication system, a wired communication system, or a combination of both. When implemented as a wireless communication system, communications system 600 may include components and interfaces suitable for communicating over wireless shared media 622-1, such as one or more antennas, transmitters, receivers, transceivers, amplifiers, filters, control logic, and so forth. An example of wireless shared media 622-1 may include portions of a wireless spectrum, such as the RF spectrum and so forth. When implemented as a wired communications system, communications system 600 may include components and interfaces suitable for communicating over wired communications media 622-2, such as input/output (I/O) adapters, physical connectors to connect the I/O adapter with a corresponding wired communications medium, a network interface card (NIC), disc controller, video controller, audio controller, and so forth. Examples of wired communications media 622-2 may include a wire, cable, metal leads, printed circuit board (PCB), backplane, switch fabric, semiconductor material, twisted-pair wire, co-axial cable, fiber optics, and so forth. The embodiments are not limited in this context.

In various embodiments, communications system 600 may include a wireless device 620. Wireless device 620 may comprise, for example, a mobile or fixed wireless device. In one embodiment, for example, wireless device 620 may comprise a fixed wireless device operating as an access point for a network or communications system, such as a cellular radiotelephone communications system, a wireless local area network (WLAN), a wireless metropolitan area network (WMAN), a wireless wide area network (WWAN), and so forth. Examples for wireless device 620 may include a wireless access point, base station or device B, base station radio/transceiver, router, switch, hub, gateway, and so forth. In one embodiment, for example, wireless device 620 may comprise a base station for a cellular radiotelephone communications system. Although some embodiments may be described with wireless device 620 implemented as a base station by way of example, it may be appreciated that other embodiments may be implemented using other wireless devices as well. The embodiments are not limited in this context.

In one embodiment, mobile computing device 500 and wireless device 620 may comprise part of a cellular radiotelephone system. Examples of cellular radiotelephone systems may include Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) systems such as Wide-band CDMA (WCDMA), CDMA-2000, Universal Mobile Telephone System (UMTS) cellular radiotelephone systems compliant with the Third-Generation Partnership Project (3GPP), and so forth. The embodiments are not limited in this context.

In addition to voice communication services, mobile computing device 500 and wireless device 620 may be arranged to perform data communications using any number of different wireless protocols over wireless shared media 622-1. In one embodiment, for example, mobile computing device 500 and wireless device 620 may be arranged to perform data communications using any number of different WWAN data communication services. Examples of cellular data communication systems offering WWAN data communication services may include GSM with General Packet Radio Service (GPRS) systems (GSM/GPRS), CDMA/1×RTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, and so forth. In one embodiment, for example, mobile computing device 500 and wireless device 620 may also be arranged to communicate using a number of different WLAN data communication services. Examples of suitable WLAN data communication services may include the Institute of Electrical and Electronics Engineers (IEEE) 802.xx series of protocols, such as IEEE 802.11a/b/g/n, IEEE 802.16, IEEE 802.20, and so forth. In one embodiment, for example, mobile computing device 500 and wireless device 620 may be further arranged to communicate using a number of shorter range wireless protocols, such as a wireless personal area network (PAN) protocols, an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may include near-field communication techniques and protocols, such as electromagnetic induction (EMI) techniques. An example of EMI techniques may include passive or active radio-frequency identification (RFID) protocols and devices. The embodiments are not limited in this respect.

In one embodiment, communications system 600 may include network 630 connected to wireless device 620 by wired communications medium 622-2. Network 630 may comprise additional devices and connections to other networks, including a voice/data network such as the Public Switched Telephone Network (PSTN), a packet network such as the Internet, a local area network (LAN), a metropolitan area network (MAN), a wide area network (WAN), an enterprise network, a private network, and so forth. In one embodiment, for example, network 630 may be arranged to communicate information in accordance with one or more Internet protocols as defined by the Internet Engineering Task Force (IETF), such as the Transmission Control Protocol/Internet Protocol (TCP/IP), for example. Network 630 may also include other cellular radio telephone system infrastructure and equipment, such as base stations, mobile subscriber centers, central offices, and so forth. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A mobile computing device, comprising:
a metadata information database to store metadata;
a media object database to store media objects;
a media content manager to couple with said metadata information database and said media object database, said media content manager comprising:
  a map location module coupled with a location device to generate location information metadata associated with a media object when the media object is created, and store said location information metadata in said metadata information database;
  a metadata manager to retrieve and associate metadata from said metadata information database with different media objects;
  a media object classifier to classify said media objects into hierarchical categories based on said metadata; and
  an album generator to generate a media album representing a hierarchical category;
a user preference database coupled with said media content manager, said user preference database to store a user profile, said user profile to include a set of user preferences to define metadata associated with a given media object,
a graphics user interface application, said graphics user interface application to display multiple thumbnail images for said hierarchical categories grouped in a media album, and a collection of thumbnail images for each of multiple media albums for said hierarchical categories grouped in a media album collection, on a display for said mobile computing device, the collection of thumbnail images for each of multiple media albums displayed as a reduced image size of each of the multiple thumbnail images grouped in the media album; and
a map generator to couple with a map information database, said media object database, and the map location module, said map generator to generate a map with map information from said map information database, said map generator to position a thumbnail image of a media object on said map using said location information metadata generated by said map location module, the thumbnail image to visually identify content for the media object.

2. The mobile computing device of claim 1, said display comprising a touch screen display coupled with said media content manager, said touch screen display to display said media album.

3. The mobile computing device of claim 1, said map location module to provide location information to said metadata manager for use as metadata to organize said media objects into said hierarchical categories.

4. The mobile computing device of claim 1, said location device comprising a global positioning satellite transceiver or a cellular triangulation device.

5. The mobile computing device of claim 1, comprising a media source node coupled with said media content manager, said media source node to provide said media objects to said media content manager.

6. The mobile computing device of claim 1, comprising an antenna coupled with a radio system, said radio system having a baseband processor and a transceiver.

7. The mobile computing device of claim 1, comprising a processing system including a processor and a memory unit, said memory unit to store program instructions for said media content manager, and said processor to execute said program instructions.

8. The mobile computing device of claim 1, said map generator to:
couple with said user preference database;
determine a filtering parameter included in said user profile for filtering thumbnails to be positioned on said map;
determine whether said thumbnails satisfy the filtering parameter using metadata associated with media objects corresponding to said thumbnails; and
filter said thumbnails based on a determination that said thumbnails correspond to media objects satisfy the filtering parameter, wherein particular ones of said thumbnails satisfying the filtering parameter are positioned on said map, and other particular ones of said thumbnails that do not satisfy the filtering parameter are not positioned on said map.

9. The mobile computing device of claim 8, wherein said filtering parameter is a time period criterion, wherein particular ones of said thumbnails corresponding to media objects having metadata indicating that the media objects satisfying the time period criterion are positioned on said map, and wherein said other particular ones of said thumbnails corresponding to media objects having metadata indicating that the media objects do not satisfy the time period criterion are not positioned on said map.

10. The mobile computing device of claim 8, wherein said filtering parameter is an account name criterion, wherein particular ones of said thumbnails corresponding to media objects having metadata indicating that the media objects satisfying the account name criterion are positioned on said map, and wherein said other particular ones of said thumbnails corresponding to media objects having metadata indicating that the media objects do not satisfy the account name criterion are not positioned on said map.

11. A method, comprising:
receiving multiple media objects;
associating metadata with each media object;
retrieving a set of user preferences to define the metadata associated with a given media object from a user profile;
organizing said media objects into hierarchical categories based on said metadata associated with each media object, said metadata including location information metadata generated using a location device when the media object is created;
displaying multiple thumbnail images for said hierarchical categories in a media album, and a collection of thumbnail images for each of multiple media albums for said hierarchical categories in a media album collection, on a display for a mobile computing device, the collection of thumbnail images for each of multiple media albums displayed as a reduced image size of each of the multiple thumbnail images grouped in the media album; and
generating a map with a thumbnail image of a media object positioned on said map using said location information metadata associated with said media object, the thumbnail image to visually identify content for the media object.

12. The method of claim 11, wherein the method includes:
determining a filtering parameter for filtering thumbnails to be positioned on said map, said filtering parameter included in said user profile;
determining whether said thumbnails satisfy the filtering parameter using metadata associated with media objects corresponding to said thumbnails; and
filtering said thumbnails based on a determination that said thumbnails correspond to media objects satisfy the filtering parameter, wherein particular ones of said thumbnails satisfying the filtering parameter are positioned on said map, and other particular ones of said thumbnails that do not satisfy the filtering parameter are not positioned on said map.

13. The method of claim 12, wherein said filtering parameter is a time period criterion, wherein particular ones of said thumbnails corresponding to media objects having metadata indicating that the media objects satisfying the time period criterion are positioned on said map, and wherein said other particular ones of said thumbnails corresponding to media objects having metadata indicating that the media objects do not satisfy the time period criterion are not positioned on said map.

14. The method of claim 12, wherein said filtering parameter is an account name criterion, wherein particular ones of said thumbnails corresponding to media objects having metadata indicating that the media objects satisfying the account name criterion are positioned on said map, and wherein said other particular ones of said thumbnails corresponding to media objects having metadata indicating that the media objects do not satisfy the account name criterion are not positioned on said map.

15. A non-transitory computer-readable storage medium containing instructions that when executed by a processor, enable a system to:
receive multiple media objects,
associate metadata with each media object,
retrieve a set of user preferences to define the metadata associated with a given media object from a user profile;
organize said media objects into hierarchical categories based on said metadata associated with each media object, said metadata including location information metadata generated using a location device when the media object is created,
display multiple thumbnail images for said hierarchical categories in a media album, and a collection of thumbnail images for each of multiple media albums for said hierarchical categories in a media album collection, on a display for a mobile computing device, the collection of thumbnail images for each of multiple media albums displayed as a reduced image size of each of the multiple thumbnail images grouped in the media album; and
generate a map with a thumbnail image of a media object positioned on said map using said location information metadata associated with said media object, the thumbnail image to visually identify content for the media object.

16. The non-transitory computer-readable storage medium of claim 15, wherein the instructions, when executed by a processor, enable a system to:
    determine a filtering parameter for filtering thumbnails to be positioned on said map, said filtering parameter included in said user profile;
    determine whether said thumbnails satisfy the filtering parameter using metadata associated with media objects corresponding to said thumbnails; and
    filter said thumbnails based on a determination that said thumbnails correspond to media objects satisfy the filtering parameter, wherein particular ones of said thumbnails satisfying the filtering parameter are positioned on said map, and other particular ones of said thumbnails that do not satisfy the filtering parameter are not positioned on said map.

17. The non-transitory computer-readable storage medium of claim 16, wherein said filtering parameter is a time period criterion, wherein particular ones of said thumbnails corresponding to media objects having metadata indicating that the media objects satisfying the time period criterion are positioned on said map, and wherein said other particular ones of said thumbnails corresponding to media objects having metadata indicating that the media objects do not satisfy the time period criterion are not positioned on said map.

18. The non-transitory computer-readable storage medium of claim 16, wherein said filtering parameter is an account name criterion, wherein particular ones of said thumbnails corresponding to media objects having metadata indicating that the media objects satisfying the account name criterion are positioned on said map, and wherein said other particular ones of said thumbnails corresponding to media objects having metadata indicating that the media objects do not satisfy the account name criterion are not positioned on said map.

* * * * *